United States Patent [19]

Hunter

[11] 4,278,376
[45] Jul. 14, 1981

[54] LOAD RESTRAINING PANEL

[76] Inventor: Mike E. Hunter, 6347 Acorn Forest Dr., Houston, Tex. 77088

[21] Appl. No.: 47,289

[22] Filed: Jun. 11, 1979

[51] Int. Cl.³ .................... B60P 7/14; B61D 45/00; B62P 33/02
[52] U.S. Cl. ..................... 410/130; 410/48; 410/104
[58] Field of Search ............. 410/46, 105, 118, 121, 410/126, 127, 129, 130, 134, 134, 144, 156; 105/47, 48, 104, 127, 130

[56] References Cited

U.S. PATENT DOCUMENTS

| Re. 28,788 | 4/1976 | Williamson | 410/118 |
|---|---|---|---|
| 2,388,304 | 11/1945 | Ackerman et al. | 410/46 |
| 3,193,122 | 6/1965 | Sauthoff | 410/129 X |
| 3,229,994 | 1/1966 | Klein | 410/144 |
| 3,428,330 | 2/1969 | Klein | 410/156 |
| 3,620,171 | 11/1971 | Brenia et al. | 410/105 |
| 3,779,174 | 12/1973 | Doyle et al. | 410/129 X |
| 4,049,311 | 9/1977 | Dietrich et al. | 410/134 |
| 4,185,799 | 1/1980 | Richards, Jr. | 410/130 X |

Primary Examiner—John P. Silverstrim
Assistant Examiner—Howard Beltran
Attorney, Agent, or Firm—Darryl M. Springs

[57] ABSTRACT

In one exemplar embodiment, a load restraining apparatus for cargo vehicles having a generally rectangular load space defined by side walls and a flat bed is provided having a pair of elongated slotted-rail assemblies each of which includes an inner longitudinal channel adjacent to and communicating with the longitudinal slot in the rails which are mounted in a spaced-apart parallel relationship the longitudinal length of the flat bed of the vehicle. A pair of slide members that are adapted for cooperating with the longitudinal channels of the slotted-rails for slideable movement therein are provided, and each of the rails includes a generally vertical bracket member extending through the longitudinal slot in the rail for guiding the slide means and providing a structural member to which is attached a cargo restraining panel or board that is disposed transversely across the spaced slotted-rails and attached to the slide bracket member for permitting the cargo restraining board to be moved longitudinally along the split rails to a desired position. A locking device is disposed on each of the slide members that cooperates with the slotted-rails locking the slides to the rail in the desired position.

14 Claims, 7 Drawing Figures

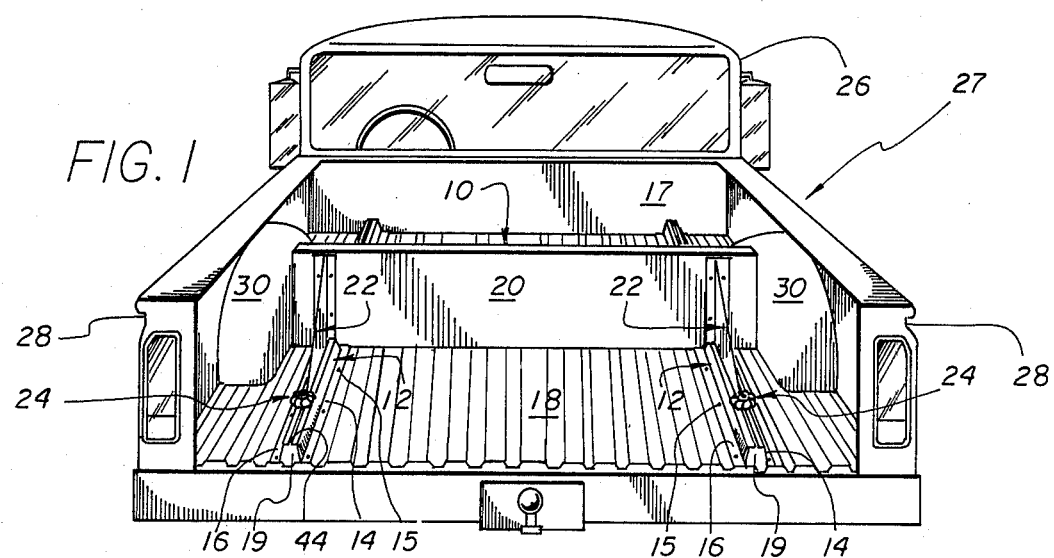
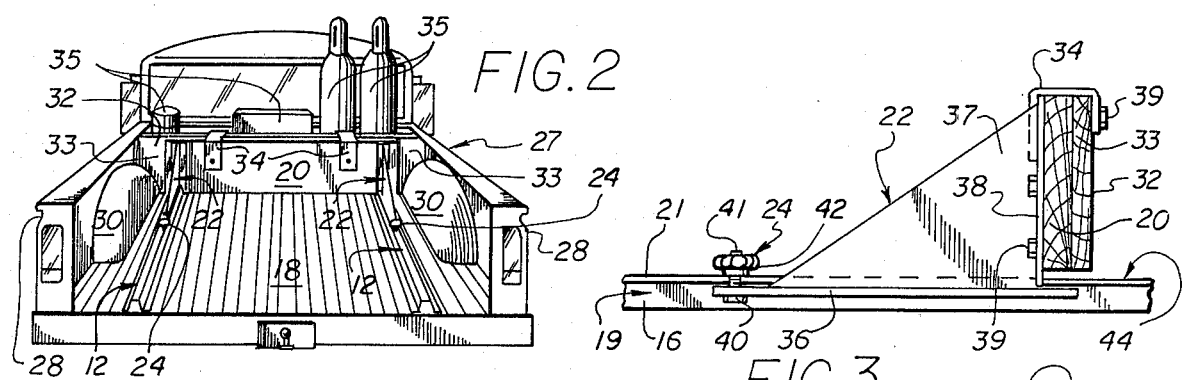
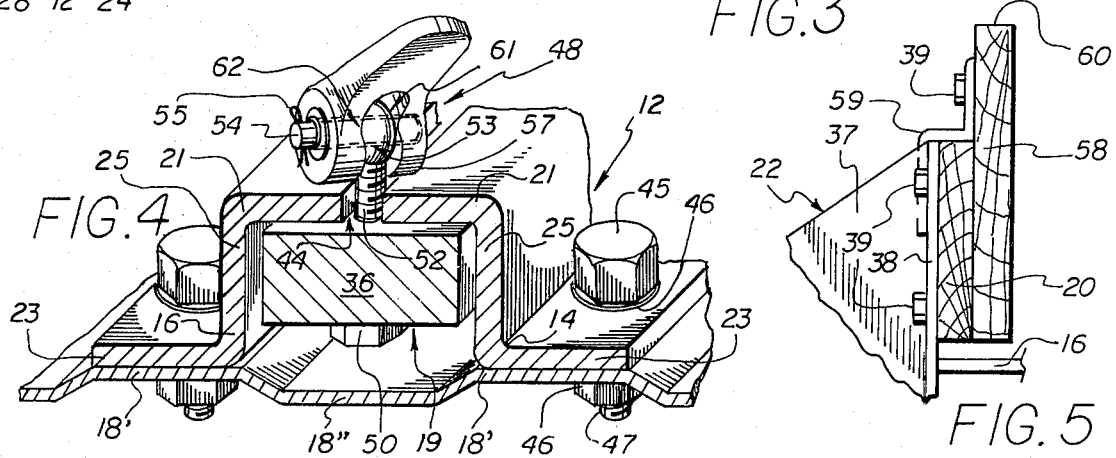
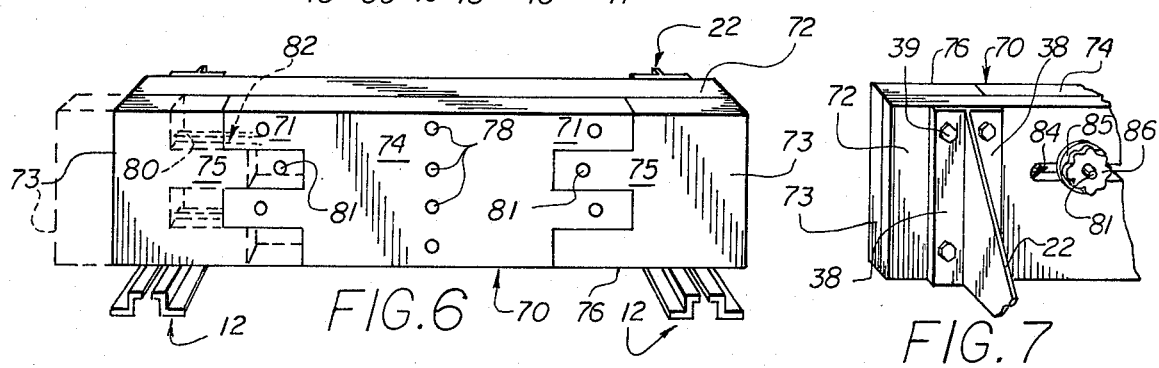

LOAD RESTRAINING PANEL

BACKGROUND OF THE INVENTION

This invention relates to apparatus for adjusting the size of the load space in a cargo vehicle having a generally rectangular load space defined by side walls and a generally flat bed.

Many businesses use pickup trucks and vans in their business for transporting and delivering items that are used in the provision of services, such as painting contractors, carpenters, plumbers, and others, and those who are delivering small quantities of goods to a customer. However, quite often the loads or cargo items are only few in number, fragile or odd-sized such that they utilize only a small portion of the available load space and consequently roll and slide around within the cargo space as the vehicle is moving. Without some means to secure such small loads, the cargo items may be damaged in transit, causing a loss to the company or the carrier, and delaying delivery of the items to the customer. Particularly troublesome are large heavy items such as barrels or cans of paint, chemicals, cleaning solvents and the like which may burst open and spill their contents if the cargo vehicle strikes an obstruction, is involved in a minor accident, or must suddenly stop because of traffic conditions. In addition, extremely large and heavy items such as various compressed gas tanks and other odd shaped cargo items are difficult to secure in such an open cargo space.

The prior art has supplied various means of attempting to solve this problem like tie-downs, racks and bins for holding the cargo items. However, these solutions do not generally provide a readily adjustable apparatus for varying the cargo vehicle load space and providing a load restraining means to keep the cargo items from moving within the cargo space while the vehicle is in motion. Some attempts have been made to solve this problem, notably the various load restraining apparatus and compartment doors as disclosed in the following U.S. Pat. Nos. 4,049,311 (Dietrich et al), Re. 28,788 (Williamson) and 2,388,304 (Ackerman et al). In addition, two U.S. Pat. Nos. 3,428,330 and 3,229,994 (Klein) disclose an adjustable load retaining rack for an open bodied truck that makes use of a pair of spaced parallel rails mounted on the top of the opposite sides of the truck body, which rails can be fitted with a shoe sliding over each rail for supporting vertical posts above each rail with an attached cross bar. However, the load restraining rack disclosed in the above patents extends in the air above the vehicle causing vehicle clearance problems, and is not suitable for use in a enclosed cargo vehicle such as a delivery van, since there are no sides of a truck body upon which to mount the load retaining rack apparatus.

Accordingly, one primary feature of the present invention is to provide an adjustable load restraining apparatus for cargo vehicles having a generally rectangular load space defined by side walls and a flat bed that is utilizable both in an open cargo vehicle such as a pickup truck and enclosed delivery vans or pickup trucks with camper enclosures over the load space.

Another feature of the present invention is to provide an adjustable load restraining apparatus that may be quickly and easily adjusted from a large load space area to a small load space area by the vehicle operator.

Yet another feature of the present invention is to provide a load restraining apparatus for cargo vehicles that may be quickly and easily installed in all types of cargo vehicles such as pickup trucks and vans.

Still another feature of the present invention is to provide an adjustable load restraining apparatus for cargo vehicles that includes means for increasing the surface area of a load contacting and restraining member when necessary.

SUMMARY OF THE INVENTION

The present invention remedies the problems of the prior art by providing an adjustable load restraining apparatus for cargo vehicles having a generally rectangular load space defined by side walls and a flat bed that comprises a pair of elongated slotted-rail means each of which includes an inner longitudinal channel adjacent to and communicating with the longitudinal slot in the rail means, fastening means for attaching the pair of slotted-rail means to the flat bed of the vehicle within the defined load space in a spaced parallel relationship, a pair of slide means each adapted for cooperating with the longitudinal channel of one of the slotted-rail means for slideable longitudinal movement therein, each of the means including a generally vertical bracket member extending through the longitudinal slotted-rail for guiding the slide means during longitudinal movement in the rail channel, cargo restraining means disposed transversely across the spaced slotted-rail means and attached to the pair of slide means bracket members for selectively positioning the cargo restraining means at a desired position along the pair of split-rails for defining a desired load space between the cargo restraining means and the side walls of the vehicle load space, and locking means disposed on the slide means and cooperating with the slotted-rail means for locking the slide means in the rail means.

In accordance with a further principle of this invention the apparatus includes a slide member adapted for slideable longitudinal movement within the slotted-rail means in the channel which has a generally triangular vertically oriented bracket member fixed to the slide member and projecting through the rail slot, one projecting edge of the bracket member extending generally perpendicularly above the slotted-rail means, the bracket member having a mounting flange projecting generally transversely from the generally perpendicular edge of the bracket member, and a generally rectangular rigid panel member mounted on the flanges for defining the load space and providing a contact surface for the cargo carried in the defined load space and restraining the cargo, the panel member being adapted for closely-spaced transverse disposition between a pair of opposing side walls of the vehicle load space and moveable longitudinally along the slotted-rail means.

In accordance with a further principle of this invention, the apparatus further includes a generally rectangular rigid extension member removably attachable to the cargo restraining member for increasing the surface area of the cargo restraining member and providing either increased height or increased transverse length. A bracket attached to the extension member provides means for removable attachment of the extension member to the cargo restraining panel member.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings:

FIG. 1 is a perspective view of an open bed cargo vehicle showing the load restraining invention mounted in the bed of the vehicle.

FIG. 2 is a perspective view of an open bed cargo vehicle showing the load restraining invention mounted therein and including an extension means for use with small cargo spaces.

FIG. 3 is a side elevation view of a typical slide member, bracket member and cargo restraining panel with an extension panel attached.

FIG. 4 is a partial detailed vertical cross-sectional view of a slide member mounted for longitudinal movement within the rail means and showing details of the cam locking device.

FIG. 5 is a partial planned view of yet another embodiment of an extension panel attached to the cargo restraining means.

FIG. 6 is a perspective view of an extension means mounted to the cargo contacting surface of the load restraining panel.

FIG. 7 is a partial perspective view of the rear side of the panel member shown in FIG. 6 showing the locking means cooperating with the extension means mounted on the cargo contacting surface of the load restraining panel.

DETAILED DESCRIPTION OF THE PREFERRED EMBODIMENTS

Referring now to FIGS. 1, 2 and 4, a cargo vehicle 26 such as a conventional pickup truck is shown with an open load space 27 having the load restraining apparatus 10 mounted therein. The vehicle load space 27 is generally rectangular and defined by side walls 28, internal wheel fenders 30 and forward wall 17 and has a generally flat bed 18. The tail gate (not shown) may be removed when the load restraining apparatus 10 is utilized, or it may be retained, is desired. Apparatus 10 comprises a pair of slotted-rail assemblies or means 12 attached conventionally by means of screws or bolts 15 in a spaced apart parallel relationship the longitudinal length of vehicle bid 18. Each rail assembly 12 comprises a pair of rail members 14 and 16 having a generally Z-shaped cross-ssectional configuration and disposed in an opposed closely-spaced parallel relationship to define an inner longitudinal channel 19 and a longitudinal slot 44. A slide assembly or means 22 is adapted for cooperating with the longitudinal channel 19 of the slotted-rail assemblies 12 for slideable movement therein. Details of the slide means 22 will be hereinafter further described.

Affixed to slide means 22 is a generally vertically oriented cargo restraining member or means 20 that is disposed transversely across the slotted-rail assemblies 12 and may be selectively positioned along the longitudinal length of the split-rail assemblies 12 for defining a desired load space between the cargo restraining member 20 and the cooperating side walls of the vehicle load space, such as side walls 28 and forward wall 17. In the pickup truck 26 as shown in FIG. 1, the interior wheel fenders 30 protrude into the cargo load space 27 and the cargo restraining member 20 must be sized such that its transverse length will pass between the shorter distance between the spaced interior wheel fenders 30. A manual locking device 24 is attached to slide means 22 (as will be hereinafter further described) and cooperates with the top surface of rail members 14 and 16 to lock the slide means and the cargo restraining member in a desired position.

Referring primarily to FIG. 2, there may be times when cargo articles 35 may need only a narrow space forward of the interior wheel fenders 30, it may be necessary to have a means of extending the transverse ends of the cargo restraining panel 20 to closely abutt side walls 28. In such a case, an extension means 32, such as a longer board or panel member may be mounted ahead of panel member 20 by means of suitable brackets 34 which will provide transverse extending side extensions 33 that will fit closely adjacent side wall 28 to prevent small articles from sliding around the cargo restraining panel 20. Similarly, the extension member 32 may be utilized if the needed cargo space extends rearwardly or aft of the interior wheel fenders 30. While the description herein is made with particular reference to the load space defined by a pickup truck, it should be understood that apparatus 10 can be utilized with any cargo vehicle having a generally rectangular load space and defined by side walls and a flat bed, including other types of truck type vehicles and van type vehicles having an enclosed interior load space. In such a van type cargo vehicle, apparatus 10 may be mounted for transverse longitudinal movement in the van load space, accessible through the rear doors of the van, or it may be mounted for transverse movement across the van load space, accessible through side doors of the van.

Referring now to FIGS. 1, 2, 3, 4 and 5, additional details of the load restraining apparatus will be described. Slide means 22 comprises an elongated slide member 36 having a generally rectangular cross-section and contructed of metal for withstanding the wear of repeated sliding movement in slotted-rail assemblies 12. Attached centrally to the top of slide member 36 is a generally triangular vertically oriented bracket member 37 that projects through slot 44 for guiding the rail member 36 during longitudinal movement in rail channel 19 and further acts as a structural member which supports the cargo restraining member 20. Extending from the vertically projecting edge of bracket member 37 are flanges 38 that project generally transversely from the edge of bracket member 37 and have a plurality of spaced apertures (not shown) disposed in each flange. A cargo restraining member 20 comprising a generally rectangular rigid panel member such as a 2"×12" or 2"×14" timber is attached to the spaced bracket members 37 and their extending flanges 38 by means of conventional fasteners such as bolts 39 inserted through the bolt apertures.

Locking means 24 includes a threaded projecting member 41 which may comprise a bolt 40 attached to one end of the slide member 36 along its central axis and adapted for projecting vertically from slide member 36 through rail slot 44. A rotatable nut 42 is provided for mating with the projecting end 41 of threaded member 40 and cooperatively contacting outer surface of the inwardly opposing rail member sections 21 of each rail member 14 and 16 to raise the slide member 36 upwardly as the nut is rotated downwardly on threaded member 41 for clamping slide member 36 against the inner surface rail portion 21 to prevent longitudinal movement of the slide means 22 and the attached cargo retaining member 20 relative to slotted-rail assemblies 12.

As hereinabove described, in the event that the cargo restraining member 20 needs an increased surface area contacting the cargo carried in the defined load space, an extension means 32 such as a generally rectangular panel member or timber 32 may be attached to the forward cargo contacting surface of member 20 by means of a suitable U-shaped bracket 34, one leg of which is attached by conventional fastening means such as bolts 39 to the extension member 32 with the opposite leg of the U-shaped bracket 34 hooked over the top of member 20 (see FIGS. 2 and 3). Extension means 32 is conveniently a timber that is longer than the cargo restraining panel member 20 such that its ends 33 project transversely beyond the ends of panel member 20.

In FIG. 5, another embodiment of the extension means is shown, comprising a generally rectangular panel or board member 58 that has a vertically projecting side 60 that extends above the top edge of cargo restraining member 20 to increase the height of the cargo contacting surface in the vehicle load space. Such an increased height extension member 58 may conveniently be attached to panel member 20 by means of a generally Z-shaped bracket 59 one leg of which is attached by conventional fastening means such as a bolt 89 to extension member 58, and the other end of the Z-shaped bracket 59 is insertable over the top of cargo restraining panel member 20. Of course, many other configurations of extending boards 32 and 58 may conveniently be utilized, even combining increased transverse length and increased height. There are many variation of brackets that may be utilized for attaching extension members 32 and 58 to the cargo restraining board 20. While the use of boards such as 2×12 or 2"×14" timbers has been described fo the construction of panels 20, 32 and 58, any suitable rigid material may be used including plywood, metal and plastic resin slabs.

Referring now to FIG. 4, a second embodiment of the locking means is shown. A cam lever locking means 48 is shown comprising a rigid projecting member 52 such as an eye bolt affixed to one end of slide member 36 by any conventional means such as welding or brazing or by means of a nut 50. The projecting end of eye bolt 52 is sized to project vertically from slide member 36 through the slot 44 between rail members 14 and 16. Eye bolt 52 has an aperture 53 disposed transversely therethrough. The cam locking lever has a free manipulating end 56 and a camming shoulder end 57 that has a longitudinal slot 61 disposed therein for accepting the aperture eye bolt 52. The slotted camming shoulder 57 has a transverse aperture 62 disposed therethrough registering with aperture 53 in eye bolt 52. A pivot pin 54 is disposed through apertures 62 and 53 of the slotted camming shoulder end 57 and the rigid eye bolt member 52 for permitting pivotal movement of the extending free end 56 of the locking lever about pin 54 relative to the projecting eye bolt end of rigid member 52. Pivot pin 54 may be retained by means of appropriate locking washers or a cotter pin 55. As the free end 56 of the locking lever is manipulated downwardly the camming surface of cam shoulder 57 contacts the top surface of the rail sections 21 of rail members 14 and 16 for lifting pivot pin 54 and the attached rigid eye bolt member 52 upwardly, thereby carrying slide member 36 upwardly to raise slide member 36 and clamping the upper surface of slide member 36 against the inner surface of the rail section 21 to prevent longitudinal movement of slide means 22 relative to the slotted-rail means 12.

Referring now to FIGS. 1, 2 and 4, the mounting of the spaced parallel rail means 12 is shown in greater detail. As hereinabove described, each rail means 12 comprises a pair of elongated rail members 14 and 16 having a generally Z-shaped cross-sectional configuration, preferably of ¼" or ⅜" flat bar stock brake pressed into the desired cross-sectional configuration, and having an upper extending rail section 21 and an opposing extending mounting flange section 23 interconnected by an upright side member 25. Bed 18 of many cargo vehicles such as pickup trucks and vans generally has a corrugated bed surface having alternate raised flat-topped flutes or peaks 18' interconnected by alternate valleys or lower flat-bottomed flutes 18". Rail members 14 and 16 would have to be sized and proportioned such that the mounting flange sections 23 would be attached to two spaced bed section peaks 18', while the valley section 18" cooperates with the opposed rail member sides 25 and rail sections 21 to form the hereinabove described longitudinal inner channel 19 for accomodating slide member 36 for purposes hereinabove described. Of course, the rail flanges 23 could be permanently fixed to bed 18 by means of brazing or welding, or preferrably could be removably attached by any conventional fastening means such as bolt 45, lock washers 46 and nut 47.

Referring now to FIGS. 6 and 7, another embodiment of the cargo restraining means 20 is shown. A fixed panel member 72, similar to the construction of the short panel member 20 hereinabove described, is attached to the mounting flanges 38 of the slide and bracket means 22 by means of conventional fasteners such as bolts 39 as hereinabove described. A generally rectangular extension panel section 74, shorter in length than the transverse length of panel member 72, is centrally attached to the forward cargo contacting surface of panel member 72 by means of conventional fastening means 78 which can conveniently be bolts or rivets 78. The central extension panel 74 includes a pair of projecting generally rectangular guide arms 71. A pair of extension panel end sections 76 include a pair of projecting generally rectangular extending members 75 that are adapted to fit alternately between the extending guide arms 71 of the extension panel section 74 to permit transverse sliding movement between the extending guide arms 71 and extending members 75. Such transverse movement permits the end portion 73 of extension panel section 76 to be moved to a position beyond the transverse ends of panel member 72 as shown by the dotted lines.

The movable extension panel sections 76 are maintained in alignment with the first extension panel section 74 by means of guide means that may comprise a tongue and groove arrangment 80 and 82, respectively, disposed on mating surfaces of the edges of the extending guide arms 71 and the mating extending members 75. A locking means is provided to lock the movable extension panel section 76 with respect to the fixed extension panel section 74 and the base panel member 72 which comprises a locking bolt 81 attached to at least one of the extending members 75 and projects through a slotted aperture 84 disposed in base panel member 72. The projecting end of the locking bolt 81, extending through slot 84, receives a bearing member or washer 85 and then has disposed over its threaded end a locking nut 86. Movable extension panel section 76 may then be moved transversely relative to the fixed extension panel section 74 and base panel 72 to provide an extension of the end portions 73 projecting beyond the transverse ends of the panel section 72 which can then be locked in a desired position by tightening the locking nut 86 against the bearing plate or washer 85 to clamp the extending members 75 of moveable section 76 against the base section 72.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. Load restraining apparatus for cargo vehicles having a generally rectangular load space defined by side walls, one fixed end and a flat bed, comprising
   a pair of elongated slotted-rails, each of said rails comprising a pair of elongated rail members each having a generally Z-shaped cross-section and disposed in an opposed closely-spaced parallel relationship to define an inner longitudinal channel and a longitudinal slot,
   fastening means for attaching said pair of slotted-rails to the flat bed of the vehicle within the defined generally rectangular load space in a spaced parallel relationship,
   a pair of elongated slide members each adapted for free slidable movement longitudinally within each of said slotted-rails inner channel,
   a pair of generally triangular plates, one of which is vertically fixed to each of said slide members for projecting upwardly through said rail slot for defining an upright bracket member, one projecting edge of said bracket member extending generally perpendicularly above each of said slotted-rails,
   a mounting flange projecting generally transversely from said generally perpendicular edge of said bracket member,
   a generally rectangular rigid panel member adapted for closely-spaced transverse disposition between a pair of opposing side walls of the vehicle load space, one surface of said panel member adapted for contact with cargo carried in said defined load space for acting as a cargo restraining member,
   fastening means cooperating with said mounting flanges of said spaced bracket members for attaching said panel member to said pair of slide means transversely to said pair of spaced slotted-rails, and
   locking means attached to each of said slide members and adapted for movement in said rail member slots and cooperating with said slotted rails to secure said slide members in said rails to position said cargo restraining member along said rail members.

2. The apparatus as described in claim 1, wherein said locking means comprises
   a threaded member fixed to said slide member and projecting vertically therefrom through said rail slot, and
   a rotatable nut adopted for mating with said projecting end of said threaded member and cooperatively contacting said slotted rail outer surface to raise said slide member as said nut is rotated downwardly on said threaded member for clamping said slide member against the inner surface of said rail means to prevent longitudinal movement of said slide means relative to said slotted-rail.

3. The apparatus as described in claim 1, wherein said panel member is a length of timber.

4. The apparatus as described in claim 1, wherein said panel member is a length of rigid plastic material.

5. The apparatus as described in claim 1, wherein said locking means comprises
   a rigid member fixed to said slide member and projecting through said slot in said rail means, and
   cam locking means pivotally mounted on the projecting end of said rigid member and cooperating with the outer surface of said slotted-rail means to raise said slide member as said cam locking means is actuated for clamping said slide member against the inner surface of said rail means to prevent longitudinal movement of said slide means relative to said slotted-rail.

6. The apparatus as described in claim 5, wherein said projecting end of said rigid member includes an aperture disposed therethrough, and said cam locking means comprises
   a locking lever having an extending free end and a camming shoulder end having a longitudinal slot disposed therein for accepting said apertured projecting end of said rigid member, said slotted camming shoulder end having a transverse aperture therethrough for registering with said aperture in said projecting end of said rigid member, and
   a pivot pin disposed through said apertures in said slotted camming shoulder end of said locking lever and said rigid member projecting end for permitting pivotal movement of said extending free end of said locking lever about said pivot pin relative to said projecting end of said rigid member, said camming shoulder surface cooperatively contacting said outer slotted-rail surface for camming said pivot pin and attached rigid member upwardly when said locking lever free end is pivoted with respect to said rigid 7. The apparatus as described in claim 1, further including
   a generally rectangular rigid extension means cooperating with said panel member to increase the surface area of said load restraining means contacting the cargo carried in said defined load space, and
   bracket means for attaching said extension means to said panel member in abutting flat relationship against said panel member cargo contacting surface.

8. The apparatus as described in claim 7, wherein said extension means is an extension panel member adapted to have ends extending transversely beyond the ends of said panel member, for increasing the effective transverse width of said panel member surface contacting the cargo carried in the vehicle load space.

9. The apparatus as described in claim 7, wherein said extension means is an extension panel member adapted to project vertically above the upper edge of said panel member for increasing the effective height of said panel member surface contacting the cargo carried in the vehicle load space.

10. The apparatus as described in claim 8 or 9, wherein said extension panel member is a length of timber.

11. The apparatus as described in claim 8 or 9, wherein said extension panel member is a length of rigid plastic material.

12. The apparatus as described in claim 7, wherein said extension means comprises
- a generally rectangular first extension panel section shorter in length than the transverse length of said panel member and centrally attached to the forward cargo contacting surface of said panel member, each end of said first extension panel section terminating in at least one extending guide arm,
- a pair of second extension panel sections disposed in a spaced opposed relationship on opposite ends of said first extension panel section, one side of each of said second extension panel sections terminating in at least one extending member,
- guide means disposed on said each of said extending guide arms and extending members and cooperating therewith to permit transverse outward movement of said second extension panel sections with respect to said first extension panel section and said panel member, and
- locking means cooperating with said panel member and said pair of second extension panel sections for permitting limited opposed transverse movement of said pair of second extension panel sections beyond the transverse ends of said panel member and locking said pair of second extension panel sections in a desired position.

13. The apparatus as described in claim 12, wherein said first extension panel section includes a pair of spaced extending guide arms projecting from each side of said first extension panel section, said second extension panel sections including at least one extending member adapted for mating with said pair of spaced extending guide arms of said first extension member, and wherein said guide means includes a tongue and groove means cooperating with said transverse mating surfaces of said first extension panel section guide arms and second extension panel section extending members for guiding said first and second extension panel sections during relative transverse movement.

14. The apparatus as described in claim 12, wherein said locking means comprises
- a pair of spaced slotted apertures disposed transversely in said panel member,
- a bolt attached to each of said second section extending members and having a threaded end projecting transversely therefrom through one of said slotted apertures, and
- a pair of locking nuts adapted for mating with said threaded end of said bolts and cooperatively contacting the rear surface of said panel member adjacent said slotted aperture for clamping said second extension panel sections against the surface of said panel member in a desired transverse position.

* * * * *